C. H. BISSELL & F. SMITH
ELECTRIC CONDUIT FITTING.
APPLICATION FILED MAR. 18, 1912.
1,156,583.
Patented Oct. 12, 1915.
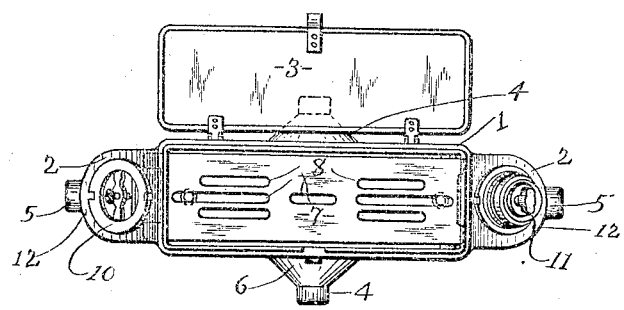
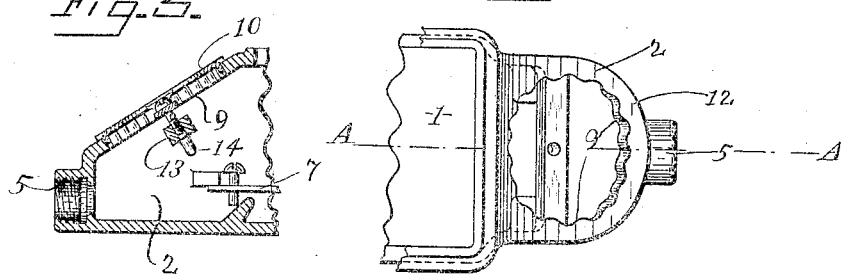
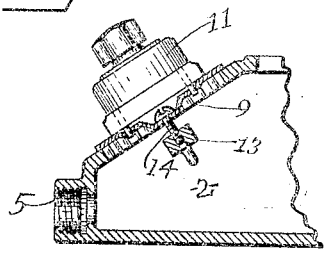
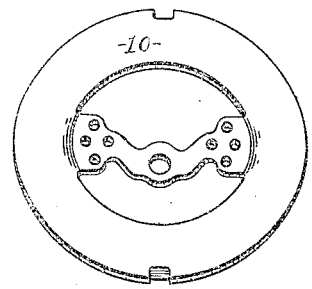
WITNESSES:
INVENTORS

UNITED STATES PATENT OFFICE.

CARL H. BISSELL AND FLOYD SMITH, OF SYRACUSE, NEW YORK, ASSIGNORS TO CROUSE-HINDS COMPANY, OF SYRACUSE, NEW YORK, A CORPORATION OF NEW YORK.

ELECTRIC-CONDUIT FITTING.

1,156,583. Specification of Letters Patent. Patented Oct. 12, 1915.

Original application filed October 6, 1910, Serial No 585,627. Divided and this application filed March 18, 1912. Serial No. 684,370.

*To all whom it may concern:*

Be it known that we, CARL H. BISSELL and FLOYD SMITH, of Syracuse, in the county of Onondaga and State of New York, have invented a certain new and useful Electric-Conduit Fitting, of which the following is a specification.

Our invention relates to electric conduit fittings and has for its object the production of a fitting adapted to receive and support a plurality of electrical appliances; and it consists in the combinations and constructions hereinafter set forth and claimed.

In describing this invention reference is had to the accompanying drawing in which like characters designate corresponding parts in all the views.

Figure 1 is a top plan of one form of our electric conduit fitting, the cover being open and an electrical appliance being mounted on one end of the fitting, and means for supporting electrical appliances being shown as in the fitting and mounted on the other end thereof. Fig. 2 is a plan of an end portion of the fitting. Fig. 3 is a sectional view on line "A—A." Fig. 2, parts being included in Fig. 3 which are not shown in Fig. 2. Fig. 4 is a view similar to Fig. 3, showing an electrical appliance supported on the fitting. Fig. 5 is a detail view of the ring for supporting the electrical appliance.

1 is the electric conduit fitting which comprises a body or box adapted to contain an electrical appliance, and extensions 2 located at opposite ends of the body and adapted to support on their exterior, electrical appliance connected to the appliances in the body, and a cover 3 for said opening. However one of said extensions may, if desired, be omitted.

The body is preferably elongated and rectangular in general outline and provided with suitable nipples 4 extending from its long sides, by which nipples connection is made with conduits inclosing the main wires. The fitting is also provided with the additional nipples 5 extending from its ends by which connection is made with other conduits inclosing branch wires.

The nipples 4 are preferably formed funnel shape at 6 at their bases for permitting spreading of the wires within the body and avoiding sharp bends in the wires.

7 is a support or plate located in the body near the bottom thereof, for supporting electrical appliances as cutouts connected to wires within the body. This plate is removable through the open top and is substantially the same size as the opening in the top, and is provided with a plurality of slots 8 for receiving the fastening means as screws associated with the electrical appliances or cutouts. The slots are employed instead of ordinary holes in order to adapt the plate to support commercial cutouts of different sizes and makes.

As seen in Figs. 3 and 4, the top of each extension 2 is inclined and converges toward the end of the fitting and is formed with an opening as a circular opening 9 which receives means as a circular plate 10 for connecting an electrical appliance, such as a switch 11, on the exterior of the fitting, to the fitting.

The features of construction of the fitting and plate 10 by which the plate is positioned and supported, form the subject matter of our application Sr. No. 585,627, filed Oct. 6, 1910, of which application this is a division, the said application resulting in Patent No. 1,034,572, issued Aug. 6, 1912.

The extensions 2 are also formed with rounding end walls 12 and the nipples 5 project from such end walls near the bottoms thereof and are located in the central line or axis of the fitting. Each extension 2 is also usually formed with a bar 13 extending between the side walls thereof crosswise of the opening 9 and beneath the top, the bar being arranged diametrically of the opening 9 and being arranged in position to receive a fastening member as a screw 14 which holds the plate 10 in position.

The lower surfaces of the nipples are preferably arranged flush with the outer surfaces of the bottom of the fitting so that when the fitting is placed against a supporting wall, the bottom of the fitting and the nipples lie contiguous to the wall, as well as the pipes or conduits connected to such nipples.

This conduit fitting is particularly advantageous in that it is adapted to contain and support the appliances as cutouts or fuses and switches, which are usually necessary in branching circuits.

What we claim is:

1. An electric conduit fitting comprising a hollow body open at its top, and having means for supporting an electrical appliance therein, the body also having means for connection with a conduit and an extension located at one end of the body and having an opening in the top thereof, the extension being provided with means for supporting an electrical appliance on the exterior thereof, substantially as and for the purpose described.

2. An electric conduit fitting comprising a hollow body open at its top and having an extension at one side of the open top, the extension having a flat top formed with an opening and means for supporting an electrical appliance on the exterior thereof with its base mounted on said wall above the opening, substantially as and for the purpose specified.

3. An electric conduit fitting comprising a hollow body open at its top, and having an extension at one end of the body, the extension being formed with means for connection with a conduit and the extension being also formed with an opening in its top and means for supporting an electrical appliance thereon with its base mounted over said opening, substantially as and for the purpose set forth.

4. An electric conduit fitting comprising a hollow body open at its top and having means for supporting an electrical appliance therein, the body also being formed with a portion at one side of the open top for supporting a switch connected to the appliance within the body, substantially as and for the purpose described.

5. An electric conduit fitting comprising a hollow body open at its top, the body having means for supporting an electrical appliance therein, and having an extension at one side of the open top, the extension having its bottom flush with the bottom of the body and having its upper wall inclined and converging toward the end of the fitting and the inclined top being formed with an opening and being designed to support on the exterior thereof an electrical appliance designed to be connected to the electrical appliance within the body, substantially as and for the purpose specified.

6. An electric conduit fitting comprising a hollow elongated body open at its top, an extension at one end of the body, the extension having a rounding end and an inclined top converging toward the end of the fitting and formed with an opening, the body being also formed with a nipple projecting from one of its long sides, and the extension being formed with a nipple projecting from its rounding end, and a cover for the open side of the body, substantially as and for the purpose set forth.

7. An electric conduit comprising an elongated body open at its top, the body having means therein for supporting an electrical appliance, extensions at opposite ends of the body, the extensions having inclined tops converging toward opposite ends of the fitting and adapted to support electrical appliances on the exterior thereof, and the body being formed with a nipple projecting from one of its long sides, and the extensions being formed with nipples projecting from their outer ends, the bottom of the fitting being flat and the lower surfaces of the nipples and the outer face of the bottom of the fitting being flush in order to lie contiguous to a supporting wall, substantially as and for the purpose described.

In testimony whereof, we have hereunto signed our names in the presence of two attesting witnesses, at Syracuse, in the county of Onondaga, in the State of New York, this 7th day of March, 1912.

CARL H. BISSELL.
FLOYD SMITH.

Witnesses:
L. M. DAVIS,
S. DAVIS.